(12) United States Patent
Namvar

(10) Patent No.: US 7,424,777 B2
(45) Date of Patent: Sep. 16, 2008

(54) PRUNING SHEARS IMPROVEMENT SYSTEM

(76) Inventor: Ali Namvar, 8775 Costa Verde Blvd., #117, San Diego, CA (US) 92122

(*) Notice: Subject to any disclaimer, the term of this patent is extended or adjusted under 35 U.S.C. 154(b) by 0 days.

(21) Appl. No.: 11/411,065

(22) Filed: Apr. 25, 2006

(65) Prior Publication Data

US 2006/0236548 A1 Oct. 26, 2006

Related U.S. Application Data

(60) Provisional application No. 60/674,810, filed on Apr. 26, 2005.

(51) Int. Cl.
*B26B 13/22* (2006.01)
*A01D 46/22* (2006.01)
(52) U.S. Cl. .............. 30/131; 30/144; 56/195; 56/335
(58) Field of Classification Search ............ 30/131, 30/132, 133, 134, 135, 144; 56/194–197, 56/202–207, 335
See application file for complete search history.

(56) References Cited

U.S. PATENT DOCUMENTS

| 423,950 | A | * | 3/1890 | Phippen et al. ............ 30/131 |
| 1,295,888 | A | * | 3/1919 | Gerrish ..................... 56/335 |
| 1,338,873 | A |   | 5/1920 | Scott |
| 1,370,208 | A | * | 3/1921 | Halicki ..................... 56/335 |
| 1,551,057 | A |   | 8/1925 | Robinson |
| 1,903,257 | A | * | 3/1933 | Dahl ........................ 30/230 |
| 2,281,189 | A |   | 4/1942 | Wright |
| 2,337,285 | A |   | 6/1943 | Widdowson |
| 2,325,734 | A |   | 8/1943 | Bishop |
| 2,415,648 | A | * | 2/1947 | Marvin ..................... 56/335 |
| 2,460,616 | A |   | 2/1949 | Appleton |
| 2,780,001 | A |   | 2/1957 | Altmann |
| 3,073,025 | A |   | 1/1963 | Yatsko |
| 3,212,186 | A |   | 10/1965 | Frauenheim |
| 3,222,783 | A | * | 12/1965 | Kolts et al. ................ 30/230 |
| 3,823,472 | A |   | 7/1974 | Richards |
| 313,334 | A |   | 1/1991 | Novak |
| 5,142,854 | A | * | 9/1992 | Chua ........................ 56/335 |
| 5,347,800 | A | * | 9/1994 | Morgan ..................... 56/335 |
| 5,383,274 | A |   | 1/1995 | Miller |
| 6,129,622 | A | * | 10/2000 | Seaman et al. ............. 452/6 |
| 2007/0157473 | A1 | * | 7/2007 | Varnell .................... 30/194 |

OTHER PUBLICATIONS

Author Unknown, Television Program aired in Turkey showing an apparatus without a saw blade on bottom, no mesh or mesh bag on the bottom, date unknown. Photographs attached.

* cited by examiner

*Primary Examiner*—Hwei-Siu C. Payer
(74) *Attorney, Agent, or Firm*—Harry V. McGahey, Esq.; McGahey & McGahey, APLC

(57) ABSTRACT

An improvement on pruning shears which allows the user to quickly saw off branches and keep debris confined during use of the shears so that clean up operations after pruning are made in a shorter time and with less effort.

6 Claims, 2 Drawing Sheets

PRUNING SHEARS IMPROVEMENT SYSTEM

CROSS-REFERENCE TO RELATED APPLICATIONS

This patent claims priority based upon the filing of U.S. Provisional Patent Application No. 60/674,810 on Apr. 26, 2005.

STATEMENT REGARDING FEDERALLY SPONSORED RESEARCH OR DEVELOPMENT

No Federal Funds were used in the development of this Invention.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not Applicable.

BACKGROUND OF THE INVENTION

1. Field of the Invention

The invention disclosed herein is an improvement on hedge pruning shears which allows the user to quickly saw off branches and keep debris confined during use of the shears so that clean up operations after pruning are made in a shorter time and with less effort.

There is a great need for a way to be able to use manual hedge shears to quickly saw off branches, while still being able to confine the cuttings which result in a container or receptacle for easy clean up. With an ordinary pair of manual hedge shears, the operator must put the shears down to pick up a separate saw when large branches are encountered, then put the saw down after use, pick up the pruning shears again for use, and then the cuttings deposited upon the ground are often difficult to collect, sweep up, or pick up, because they become lodged in the ground material. Such ground material frequently consists of other shrubs, bushes, grasses, decorative rock etc. The cuttings become lodged in the ground and other plant material and are difficult and time consuming to collect. The subject invention solves this problem by being able to saw off large branches without having to stop and change instruments, and at the same time directing smaller cuttings from the hedge shears into a containing receptacle. Alternatively, without a receptacle or bag, the smaller cuttings can be periodically dumped off the chute into a trash can or other handy container.

2. Background

Hedge Pruning Shears are an important tool for landscaping, but they have the disadvantage of being messy and creating debris during use which is time consuming and labor intensive to clean up. In addition they are typically limited as the size of branches they can clip. It is estimated that up to 80% of labor costs in landscaping related to pruning is spent in the clean up process of raking, picking up, and bagging the cuttings. Up to 5% is spent in changing implements when one tool cannot be used and another must be substituted for it. This time spent is a major labor expense for gardening and landscaping companies, as well as for individual gardeners.

3. Description of Related Art including information disclosed under 37 CFR 1.97 and 1.98

There are very limited remedies for these problems at this time. Examples of relevant art include the following:

U.S. Pat. No. 2,325,734 R. H. Bishop, Jr. Aug. 3, 1943 is a Lycopodium Harvester or Clipper which utilized a vertical pair of right angle clippers with a pan for harvesting Lycopodium. It has the advantage of filling up and then having to be emptied. This makes it impractical for extensive gardening work where large amounts of clippings are generated as the apparatus must be emptied frequently.

U.S. Pat. No. 1,338,873, H. B. Scott, May 4, 1920 was a grass border shears device having an open pan, but the pan mechanism was attached vertically to a pair of vertical shears specifically for cutting edging grass. Such an apparatus would be cumbersome and would not work well with hedge trimming when working on trimming in a standing position. The open front of the pan in this invention also would not lend itself to restraining clippings from non-grassy type plants.

U.S. Pat. No. 5,383,274, Mark D. Miller, Jan. 24, 1995 consisted of garden shears with debris catchers on each blade. They have the disadvantage of having to be emptied after each cutting swing of the blades.

U.S. Design Pat. No. 313,334, Lloyd A. Novak, Jan. 1, 1991 for a clippings catching attachment for garden shears, has an enclosure unit anchored on each blade. Again, this invention cannot be used for large, continuous processing as the cuttings from each blade closing are enclosed within the blades and must be manually emptied after each cutting action.

U.S. Pat. No. 2,460,616, John F. Appleton, Mar. 10, 1944 is a grass-catching attachment for shears which consists of only a pusher like flange on one side. Again there is no provision for directing cuttings into a receptacle or onto the ground for later clean up.

U.S. Pat. No. 3,212,186, J. A. Faruenheim, Oct. 19, 1965 contains a grass catcher for grass shears but the pusher arm is only designed to prevent the deposition of grass in the area adjacent to a lawn when they are used.

All of the above examples of relevant art have the disadvantage of not being able to handle large volumes of cuttings, and/or they require switching to different implements depending on the sizes of the branches. Each of them must be emptied each time they cut something or after a short number of uses of the shear blades. None of them have the saw on one blade for sawing large branches off.

The subject invention disclosed in this application has the advantage of being able to be used for large, continuous pruning tasks because the cuttings from each blade chopping cycle drop into a receptacle bag or into a container so they do not have to be swept up. In addition, the saw on the bottom of one blade allows larger branches to be cut off without having to switch implements.

BRIEF SUMMARY OF THE INVENTION

The invention described herein is a new method to eliminate debris and ease clean up when using pruning shears.

The method consists of anchoring a pusher arm and a saw to one blade, and anchoring a cuttings collection receptacle to the opposing blade for the purpose of receiving debris as it is swept off the pusher arm into the chute. The saw on the one blade assists in chopping off large branches without having to change instruments.

Although the present invention has been described in considerable detail with reference to preferred versions above, other versions are possible. For example:

Different sizes, numbers, configurations and placements of pusher arms can be used. Alternatively, different size collection receptacles and bags can be used to retain the debris. Therefore the spirit and scope of the appended claims should not be limited to the description of the preferred versions contained therein.

DETAILED DESCRIPTION OF THE INVENTION

Figure 1:
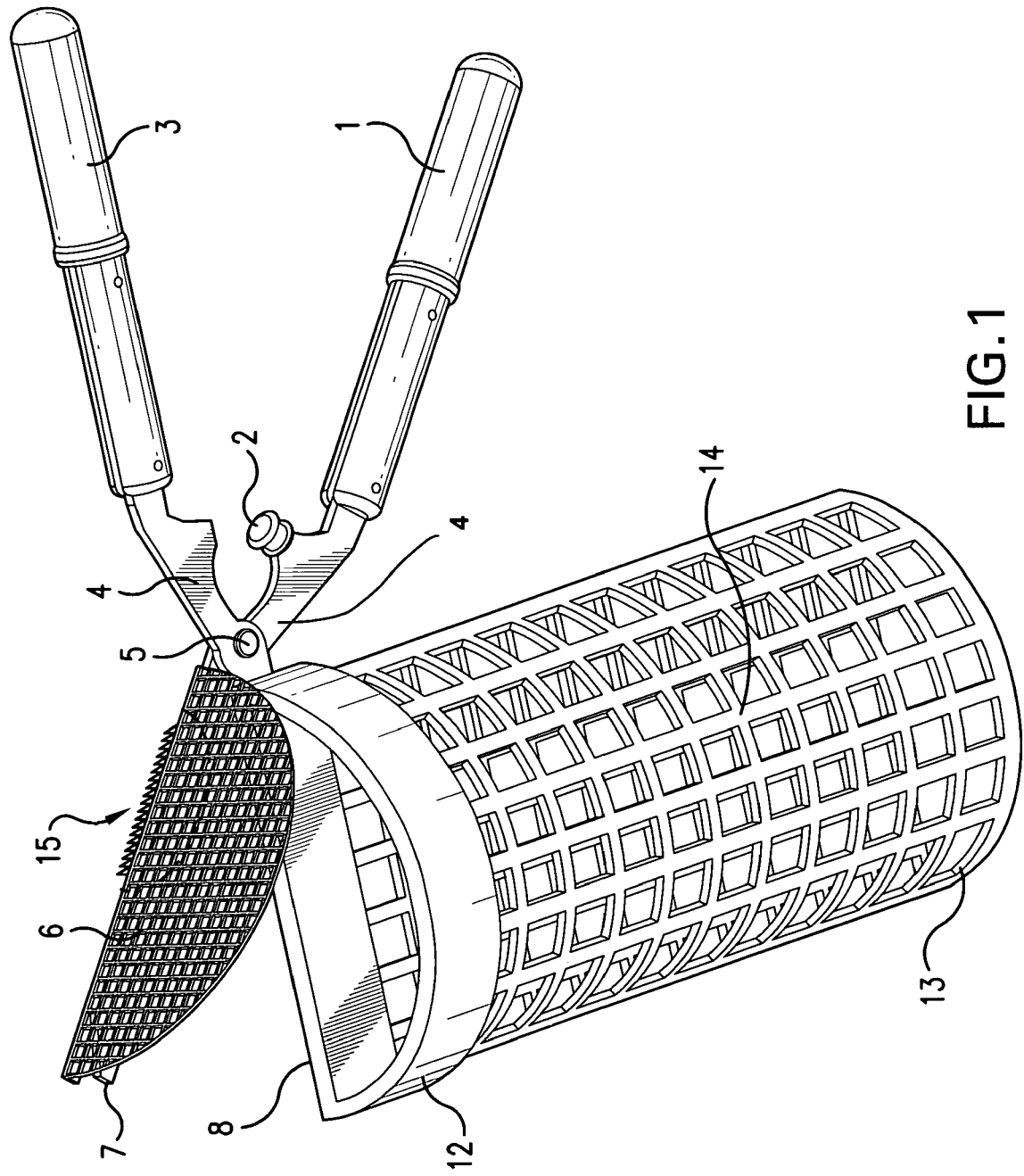
FIG. 1 illustrates an isometric view of one of the preferred embodiments of the device, looking down from above with the handle for the operator's right hand in the upper right quadrant of the drawing, using an open mesh container to hold cuttings.

FIG. 1 shows an isometric view from above of a pair of manually operated hedge pruning shears having a left side handle (1) connected to a lower right side horizontally oriented cutting edge shear blade with the sharp edge of the blade facing to the left (7) by a connecting arm (4), a right side handle (3) connected to an upper left side horizontally oriented cutting edge shear blade with the sharp edge of the blade facing to the right (8), a handle stop (2) to prevent the shears from crossing too far during the closing cycle of the blades, a connection means which in the preferred embodiment is a center axis pin (5) to hold the handles and blades in place, a pusher element (6) connected to the right side blade (7), a saw blade (15) attached in the same plane as the pusher element at a 90 degree angle to the axis of the lower right side blade (7), an open mesh container attachment ring means (12) attached to the upper blade (8), and a mesh holding cuttings receptacle (13) with holes in it (14). The open mesh container attachment ring means can be any method of attaching the open mesh container to the upper blade of the device so long as the shape of the attachment ring matches the shape of the pusher element. For the reasons described in detail in FIG. 2, a hemispherical shape of pusher element is most effective for preventing the pusher from catching on twigs and branches, therefore a hemispherical shape for the attachment ring for the open mesh container is the preferred embodiment when an open mesh container is used. Another way to describe the preferred embodiment in FIG. 1 is that FIG. 1 shows a first handle (1) connected to a first blade (7) having a first sharp edge; as well as a second handle (3), the second handle (3) being connected to a second blade (8) having a second sharp edge. The two handles with the blades attached are shown anchored together by a connection means (5). There is a handle stop means (2) to prevent the shears from crossing too far during the closing cycle of the blades. A pusher element (6) is anchored to the first blade opposite the first sharp edge, the pusher element (6) extending perpendicularly to the plane of the first blade (7) for pushing material cut off by the shears off of the first blade (7) toward the second blade (8). Also, there can be a saw blade (15) with teeth extending substantially in the same direction as the connection means and anchored to the first blade (7).

Figure 2:
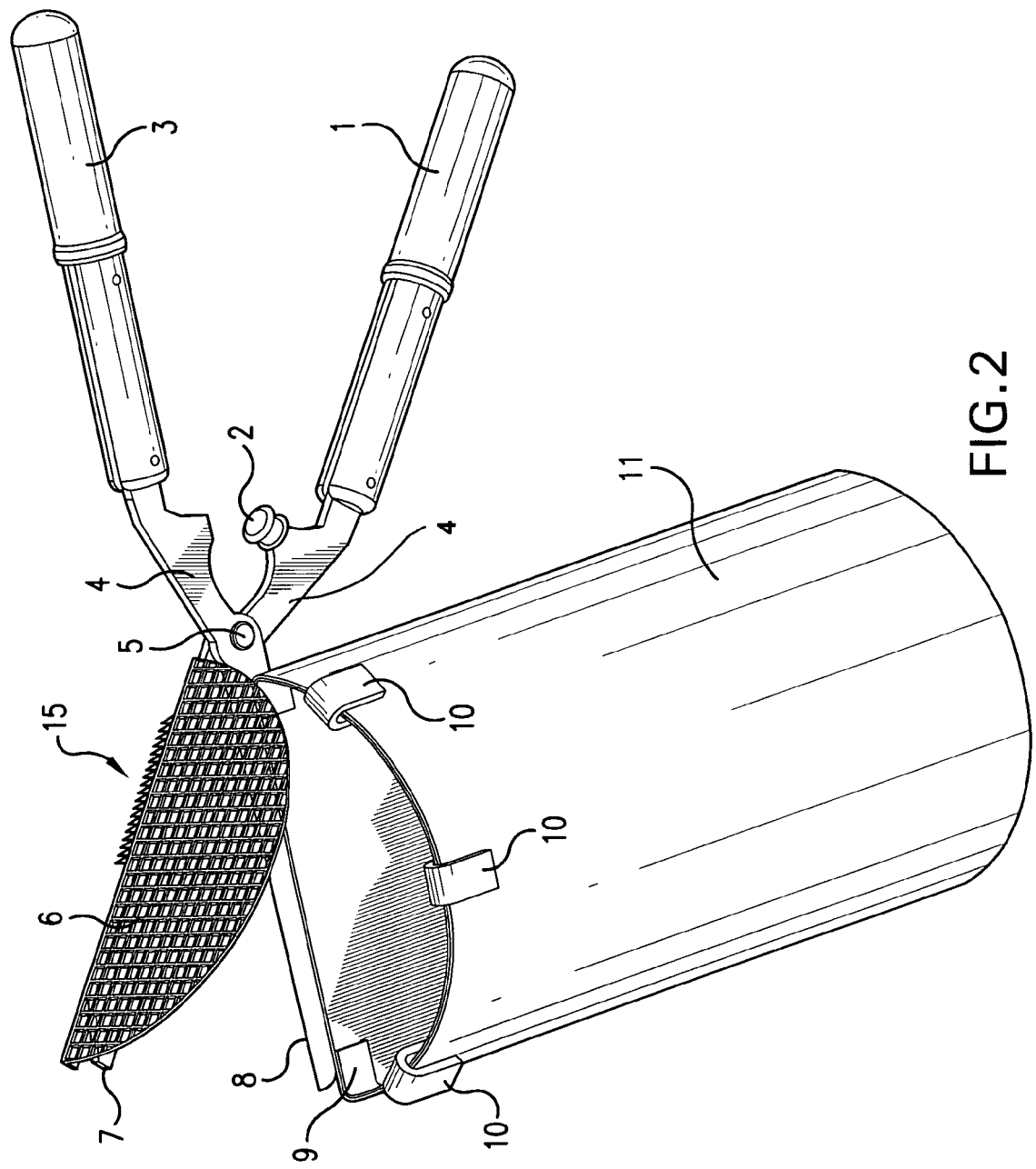
FIG. 2 illustrates an isometric view of one of the preferred embodiments of the device, looking down from above with the handle for the operator's right hand in the upper right quadrant of the drawing, using a cloth bag to hold cuttings.

FIG. 2 shows an isometric view from above of an identical device except that in this embodiment, instead of a mesh container for clippings, a cloth container (11) is attached to the upper blade (8) by a bag anchor ring (9) attached by a clip means (10). The anchor ring (9) holds the cloth container/bag (11) open by having clips (10) attached to it around the circumference of the opening of the container/bag (11) so it can receive the clippings that are swept into it by the pusher (6). In the preferred embodiment, the pusher element is hemispherical because such a shape reduces the area which can catch on twigs, branches and other projections from the plant being cut. This hemispherical shape is helpful to the speed and efficacy of the pruning process. The clip means can be any method of attaching the cloth receptacle to the upper blade of the device so long as the shape of the attachment ring holds the receptacle open sufficiently to allow twigs, branches and leaves to be swept into it by the shape of the pusher element.

Although the description above contains many specificities, these should not be construed as limiting the scope of the invention but as merely providing illustrations of some of the presently preferred embodiments of this invention. For example, the saw blade could be reversed to work on a forward or backward arm motion, the mesh, cloth or fabric container could be removed for use, the anchor ring could be higher or lower, the pusher arm could be of a hemisphere, rounded, or other shape, etc. Furthermore, the entire assembly could be easily reversed into a mirror image of itself so that it could be more easily used by left handed persons. In addition, any suitably strong, flexible material could be used for the receptacle to catch the clippings.

Thus the scope of the invention should be determined by the appended claims and their legal equivalents, rather than by the examples given.

I claim:

1. A pair of manually operated hedge pruning shears comprised of:
    a first handle;
    the first handle connected to a first blade having a first sharp edge;
    a second handle;
    the second handle connected to a second blade having a second sharp edge;
    the two handles with the blades attached anchored together by a connection means;
    a handle stop means to prevent the shears from crossing too far during the closing cycle of the blades;
    a pusher element anchored to the first blade opposite the first sharp edge;
    the pusher element extending perpendicularly to the plane of the first blade for pushing material cut off by the shears off of the first blade toward the second blade;
    a saw blade with teeth extending substantially in the same direction of the connection means and anchored to the first blade.

2. The shears of claim 1 wherein there is a receptacle means attached by an attachment means to the second sharp edge so the pusher element directs cuttings into the receptacle means.

3. The shears of claim 2 wherein the receptacle means is comprised of an open mesh enclosure means with small holes in it sufficient to allow small pieces of debris to fall through but which will retain large pieces of cuttings and debris.

4. The shears of claim 2 wherein the receptacle means is comprised of a cloth bag.

5. The shears of claim 4 wherein there is an anchoring means attached to the second blade which anchors the cloth bag by a clip means.

6. The shears of claim 1 wherein the pusher element is semicircular.

* * * * *